United States Patent
Nakagoe et al.

(10) Patent No.: US 11,233,826 B2
(45) Date of Patent: Jan. 25, 2022

(54) SYSTEM AND METHOD OF MICROSERVICE-BASED APPLICATION DEPLOYMENT WITH AUTOMATING AUTHORIZATION CONFIGURATION

(71) Applicant: Hitachi, Ltd., Tokyo (JP)

(72) Inventors: Hiroshi Nakagoe, Los Gatos, CA (US); Masanori Takada, Santa Clara, CA (US)

(73) Assignee: HITACHI, LTD., Tokyo (JP)

( * ) Notice: Subject to any disclaimer, the term of this patent is extended or adjusted under 35 U.S.C. 154(b) by 368 days.

(21) Appl. No.: 16/515,476

(22) Filed: Jul. 18, 2019

(65) Prior Publication Data
US 2021/0021643 A1    Jan. 21, 2021

(51) Int. Cl.
*H04L 9/00*         (2006.01)
*H04L 29/06*        (2006.01)
*G06F 8/60*         (2018.01)

(52) U.S. Cl.
CPC ............... *H04L 63/20* (2013.01); *G06F 8/60* (2013.01)

(58) Field of Classification Search
CPC ....... H04L 63/20; H04L 63/102; H04L 67/34; G06F 8/60
See application file for complete search history.

(56) References Cited

U.S. PATENT DOCUMENTS

| | | | |
|---|---|---|---|
| 10,952,022 B2* | 3/2021 | Schubert | H04L 41/5051 |
| 2016/0124742 A1 | 5/2016 | Rangasamy et al. | |
| 2018/0088935 A1 | 3/2018 | Church et al. | |
| 2019/0052621 A1 | 2/2019 | Sahraei et al. | |
| 2020/0201750 A1* | 6/2020 | Gadiya | G06F 11/3495 |
| 2020/0364035 A1* | 11/2020 | White | G06F 9/5038 |
| 2020/0366697 A1* | 11/2020 | Vittal | H04L 63/10 |
| 2021/0191706 A1* | 6/2021 | Sn | G06F 11/3466 |

* cited by examiner

*Primary Examiner* — Beemnet W Dada
(74) *Attorney, Agent, or Firm* — Procopio, Cory, Hargreaves & Savitch LLP

(57) ABSTRACT

Example implementations described herein are directed to systems and methods to create authorization rules and configurations automatically for each microservice, each of which rules are built from the front-end use case. The example implementations involve a public facing environment on a public cloud system, and a test environment deployed on a private cloud system that is isolated from the public cloud system that mirrors the public cloud system functionality for testing deployment of applications.

15 Claims, 19 Drawing Sheets

| Component ID | Component Name | Authorization Scope |
|---|---|---|
| 1 | Division KPI calculated by Analytics | read: manager, write: null |
| 2 | User KPI calculated by Analytics | read: user, write: null |
| 3 | Event List | read: user, write: manager |
| 4 | API for sales history | read: user, write: null |

| Source | Destination | Endpoint | Timestamp | Body |
|---|---|---|---|---|
| User Agent | API Gateway | http://apigateway/user-kpi | 2019-03-01T15:00:00Z | JSON |
| API Gateway | Analytics Service 1 | http://analytics-service-1/user-kpi | 2019-03-01T15:00:10Z | JSON |
| Analytics Service 1 | Resource Service 1 | http://resource-service-1/userdata | 2019-03-01T15:00:15Z | JSON |
| Resource Service 1 | Database 1 | N/A | 2019-03-01T15:00:20Z | SQL |
| Database 1 | Resource Service 1 | N/A (response to the above request) | 2019-03-01T15:00:22Z | TEXT |
| Resource Service 1 | Analytics Service 1 | N/A (response to the above request) | 2019-03-01T15:00:30Z | JSON |
| Analytics Service 1 | Resource Service 2 | http://resource-service-2/userdata | 2019-03-01T15:00:16Z | JSON |
| Resource Service 2 | Database 2 | N/A | 2019-03-01T15:00:25Z | MongoQL |
| Database 2 | Resource Service 2 | N/A (response to the above request) | 2019-03-01T15:00:29Z | JSON |
| Resource Service 2 | Analytics Service 1 | N/A (response to the above request) | 2019-03-01T15:00:32Z | JSON |
| Analytics Service 1 | API Gateway | N/A (response to the above request) | 2019-03-01T15:00:50Z | JSON |
| API Gateway | User Agent | N/A (response to the above request) | 2019-03-01T15:01:00Z | JSON |

FIG. 9

| Service Name | Endpoint | Authorization Scope |
|---|---|---|
| API Gateway | http://apigateway/user-kpi | read: user, write: null |
| Analytics Service 1 | http://analytics-service-1/user-kpi | read: user, write: null |
| Resource Service 1 | http://resource-service-1/userdata | read: user, write: null |
| Resource Service 2 | http://resource-service-2/userdata | read: user, write: null |

1100

```
const auth_lib = require("auth_lib");

const userroles = ['user', 'manager', 'executive'];                    ↘1200 function (request) {
  // get userinfo by sending a request with an client access token to an authorization server
  const introspection = auth_lib.introspection(request.header.authorization);

// configuration by each endpoint
  if (request.path = 'userdata') {
    // see if the given user role is over than 'user' that is written at the item of the authorization configuration series store
    if (userroles.indexOf(introspection.scope.read) >= 'user') {
      // path authorization
      return true;
    }
    // fail to authorize
    return false;
  }
  // other paths
  ...
}
```

FIG. 12

| Source | Destination | Request Query | Timestamp | Body |
|---|---|---|---|---|
| User Agent | API Gateway | { getUserKPI {kpi}} | 2019-03-01T15:00:00Z | JSON |
| API Gateway | Analytics Service 1 | { getUserKPI {kpi}} | 2019-03-01T15:00:10Z | JSON |
| Analytics Service 1 | Resource Service 1 | {getUserData(id:"userA"){sales_amount}} | 2019-03-01T15:00:15Z | JSON |
| Resource Service 1 | Database 1 | N/A | 2019-03-01T15:00:20Z | SQL |
| Database 1 | Resource Service 1 | N/A (response to the above request) | 2019-03-01T15:00:22Z | TEXT |
| Resource Service 1 | Analytics Service 1 | N/A (response to the above request) | 2019-03-01T15:00:30Z | JSON |
| Analytics Service 1 | Resource Service 2 | {getUserData(id:"userA"){costt}} | 2019-03-01T15:00:16Z | JSON |
| Resource Service 2 | Database 2 | N/A | 2019-03-01T15:00:25Z | MongoQL |
| Database 2 | Resource Service 2 | N/A (response to the above request) | 2019-03-01T15:00:29Z | JSON |
| Resource Service 2 | Analytics Service 1 | N/A (response to the above request) | 2019-03-01T15:00:32Z | JSON |
| Analytics Service 1 | API Gateway | N/A (response to the above request) | 2019-03-01T15:00:50Z | JSON |
| API Gateway | User Agent | N/A (response to the above request) | 2019-03-01T15:01:00Z | JSON |

| Service Name | Request Query | Authorization Scope |
|---|---|---|
| API Gateway | { getUserKPI {kpi}} | read: user, write: null |
| Analytics Service 1 | { getUserKPI {kpi}} | read: user, write: null |
| Resource Service 1 | { getUserData(id:"userA"){sales_amount}} | read: user, write: null |
| Resource Service 2 | { getUserData(id:"userA"){costt}} | read: user, write: null |

```
const auth_lib = require("auth_lib");

const userroles = ['user', 'manager', 'executive'];                    ⟋1600 function (request) {
  // get userinfo by sending a request with an client access token to an authorization server
  const introspection = auth_lib.introspection(request.header.authorization);

// configuration by each query
  if (JSON.stringify(request.body) === '{ getUserKPI { kpi } }') {
    // see if the given user role is over than 'user' that is written at the item of the authorization configuration series store
    if (userroles.indexOf(introspection.scope.read) >= 'user') {
      // path authorization
      return true;
    }
    // fail to authorize
    return false:
  }
  // other paths
  ...
}
```

FIG. 16

SYSTEM AND METHOD OF MICROSERVICE-BASED APPLICATION DEPLOYMENT WITH AUTOMATING AUTHORIZATION CONFIGURATION

BACKGROUND

Field

The present disclosure is generally directed to microservice architectures, and more specifically, to deployment of microservices with automated authorization configurations.

Related Art

Related art applications adopt the microservice architectural style. The microservice architectural approach is to develop many singular processes and deploy them as small services, each communicating with others via an interface such as Hypertext Transfer Protocol (HTTP) Representational State Transfer (REST) Application Programming Interface (API). The multiple microservices communicate with each other to facilitate complex and resource intensive processing.

Some microservice capabilities, such as HTTP connectivity, authentication, and authorization, are common processes across all microservices, such that the service mesh architectural style is applied to the microservice model. At the service mesh concept, the sidecar module containing the common processes is attached to each microservice and is delegated to facilitate the common process. Thus, each microservice does not need to have such common processes, which reduces the development cost.

Many applications in the related art incorporate the zero trust security model. The zero trust security model is one of the Information Technology (IT) security models which requires strict identity verification for every device and user who accesses the application resources, which is in contrast with the castle-and-moat IT security model involving a firewall to stop all unallowable network traffic and trust all internal network traffic. Considering the zero trust security model within the microservice architecture, each microservice should have an authentication process and authorization block in front of itself because no entity, including client users, client devices, and microservices running in the internal network, can be trusted.

Each microservice should have a different authorization configuration because each microservice deals with the different business logic and resource data from other entities. However, there can be hundreds of thousands of microservices in a given system, therefore creating authorization configuration for each microservice manually is not feasible.

SUMMARY

Example implementations described herein are based on the fact that authorization configurations should be determined at the use case view point, and that the application is developed with simple-component-based styles. For the former aspect, the front-end and the back-end may have different authorization policies. A user may wish to access a specific resource that is allowed on the front-end, but the back-end may prohibit access and thereby cause an access failure. Thus, authorization policies across all building blocks should be consistent. For the latter aspect, the end-to-end connection from either the front-end application or API access to the back-end microservices is traceable. At the microservice architecture, the multiple microservices associate and deal with the client requests so that microservice call graphs can be recognized by each client request. Fortunately, the recent front-end application development is component-based, which means each component sends unique and simple requests to the backend, and the end-to-end connection from either the front-end application or API access to the back-end microservices can thereby be recognized.

Example implementations described herein involve systems and methods to create authorization rules and configurations automatically for each microservice, wherein the rules are built from the front-end use case.

Aspects of the present disclosure can include a method to deploy authorization configurations to an environment comprising a plurality of microservices, the method involving receiving a component request for authorization; deploying the component on a test environment that mirrors the environment to receive a call history graph comprising one or more of the plurality of microservices invoked by the component; generating the authorization configurations for each of the one or more of the plurality of microservices based on the component request and the call history graph; and deploying the authorization configurations to the one or more of the plurality of microservices on the environment.

Aspects of the present disclosure can include a non-transitory computer readable medium storing instructions to deploy authorization configurations to an environment comprising a plurality of microservices, the instructions involving receiving a component request for authorization; deploying the component on a test environment that mirrors the environment to receive a call history graph comprising one or more of the plurality of microservices invoked by the component; generating the authorization configurations for each of the one or more of the plurality of microservices based on the component request and the call history graph; and deploying the authorization configurations to the one or more of the plurality of microservices on the environment.

Aspects of the present disclosure further include an apparatus configured to manage deployment of authorization configurations to an environment having a plurality of microservices, the apparatus involving a processor, configured to receive a component request for authorization; deploy a component associated with the component request on a test environment that mirrors the environment to receive a call history graph comprising one or more of the plurality of microservices invoked by the component; generate the authorization configurations for each of the one or more of the plurality of microservices based on the component request and the call history graph; and deploy the authorization configurations to the one or more of the plurality of microservices on the environment.

Aspects of the present disclosure can include a system to deploy authorization configurations to an environment involving a plurality of microservices, the system involving means for receiving a component request for authorization; means for deploying the component on a test environment that mirrors the environment to receive a call history graph comprising one or more of the plurality of microservices invoked by the component; means for generating the authorization configurations for each of the one or more of the plurality of microservices based on the component request and the call history graph; and means for deploying the authorization configurations to the one or more of the plurality of microservices on the environment.

BRIEF DESCRIPTION OF DRAWINGS

FIG. 8 illustrates an example of an authentication configuration list per each UI component, in accordance with an example implementation.

FIG. 9 illustrates an example of network traffic logs, in accordance with an example implementation.

FIG. 12 illustrates an example implementation for when the service mesh allows an implementation an authorization method as a function written by JavaScript, in accordance with an example implementation.

FIG. 14 illustrates the example of the network traffic logs in accordance with another example implementation.

FIG. 16 illustrates an example implementation when the service mesh allows the implementation of an authorization method as a function written by JavaScript.

DETAILED DESCRIPTION

Figure 1:
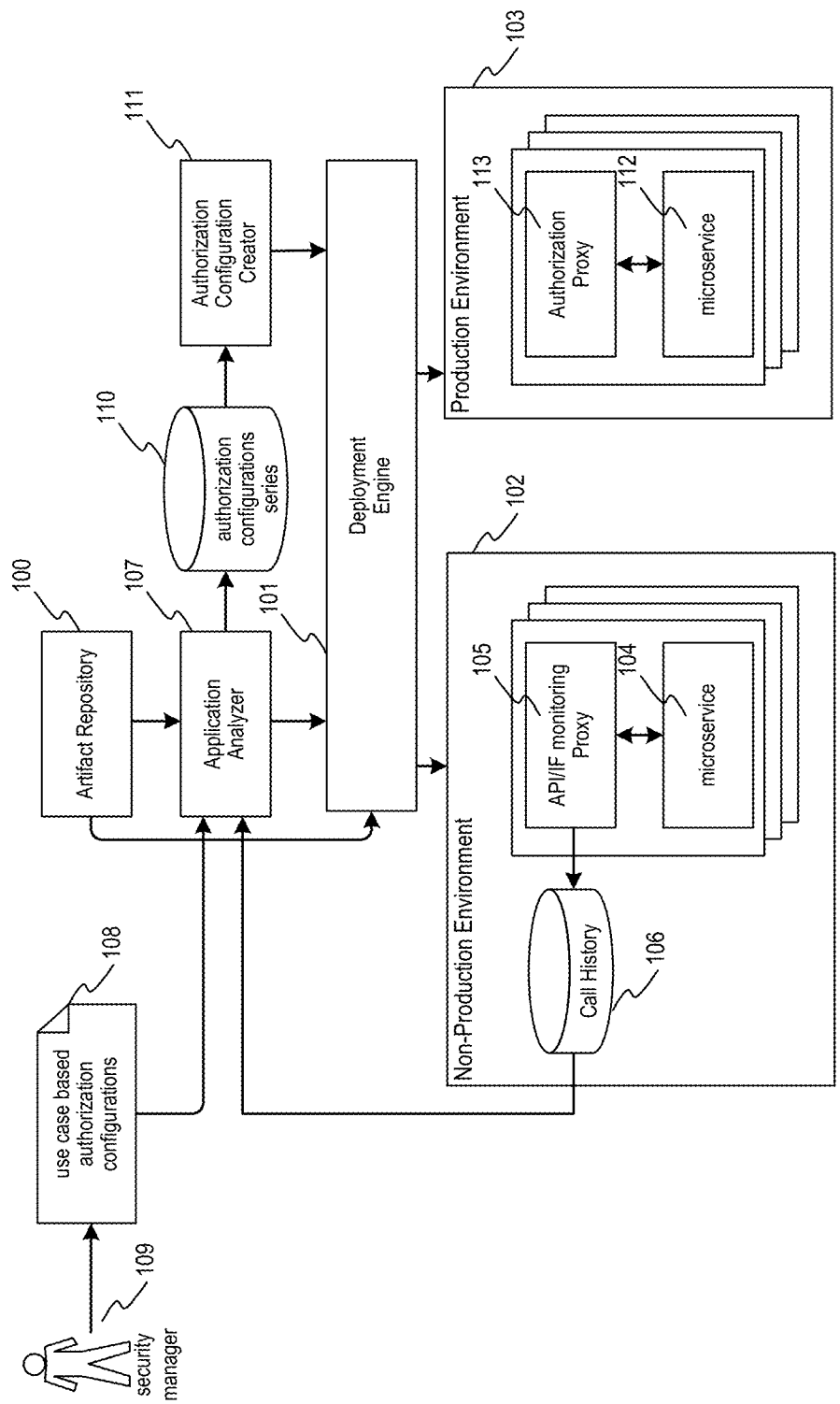
FIG. 1 illustrates an example architecture upon which example implementations may be applied.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

As described herein, a sidecar is a layer on the microservice that handles the get and response over HTTP or HTTPS depending on the desired implementation. Example implementations described herein are directed to microservices that are connected via a service mash, each of the microservices communicating either directly or through an application proxy/sidecar. Each microservice can be connected to other microservices, and in a zero trust environment, each microservice requires authentication. However, when a component (i.e., analytics that involves multiple microservices) is requested by the user, it is difficult to determine what authentication protocols are needed for which microservices.

To address such issues, the example implementations described herein involve a separate private environment that mirrors the public mesh of microservices to which the component is deployed and the call history graph of the microservices is retrieved, along with the user authentication in the component request. The user authentication is then configured to be provided to each of the microservices in the call history tree.

In a first example implementation described herein, there is a basic use case involving the implementation on a deployment environment, which can be adjusted in accordance with the desired implementation, or facilitated on other environments in accordance with the desired implementation. In the first example implementation, the implementation is explained based on the service mesh concept, which means that all microservices of the application are deployed with sidecars involving some proxies to perform some function such as giving HTTPS connectivity.

Figure 13:
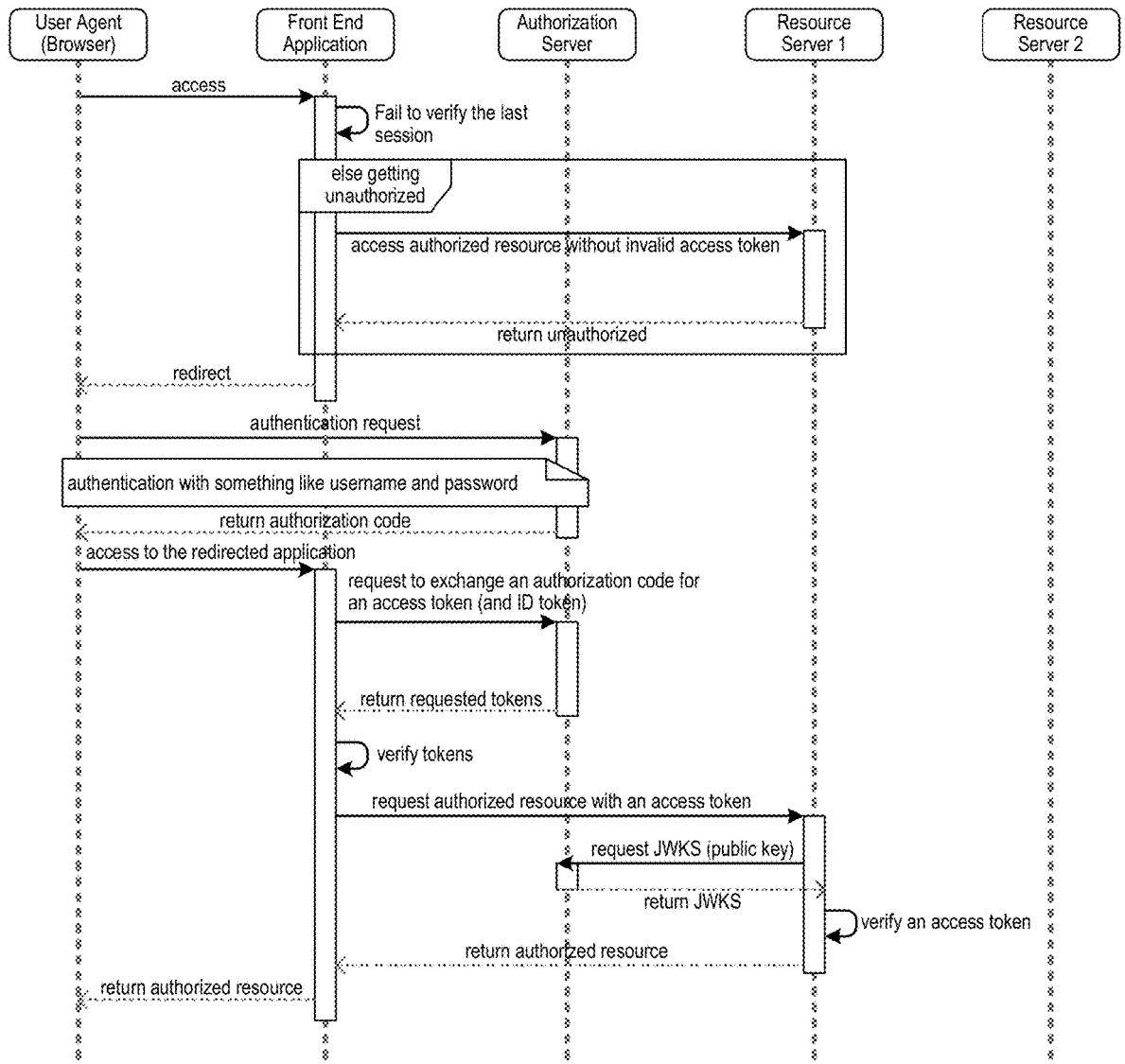
FIG. 13 illustrates an authorization flow, in accordance with an example implementation.

In the following example implementation, to illustrate the creating of authorization configurations clearly, the example implementations are described based on OAuth 2.0. OAuth 2.0 is one of the standard authorization protocols that allow servers to access to user resources on other resource servers without user credentials (e.g., password). OAuth 2.0 has been used by many applications currently, the authorization flow of which will be described with respect to FIG. 13.

FIG. 1 illustrates an example architecture upon which example implementations may be applied. The artifact repository 100 is a repository to store the software artifacts. Generally, the artifact repository 100 can include artifacts such as software binaries, Java jar files, Docker image and so on. An example of an artifact repository can be a code repository or otherwise in accordance with the desired implementation.

The deployment engine 101 is configured to control and manage software deployment and service configuration files, such as docker-compose.yml stored in the artifact repository 100. The service configuration files involve a list of services that compose the application and their configurations. This deployment engine 101 deploys the application into either the non-production environment 102 or the production environment 103 depending on the desired implementation.

The non-production environment 102 is one of the deployment environments that is isolated from production. The non-production environment 102 is used as an environment for development, test, quality assurance (QA), and other configuration optimizations in accordance with the desired implementation. The production environment 103 is the environment for the deployment of the production version of application. In an example implementation, the production environment 103 is an environment facilitated in a public cloud system that is outfacing to client devices for public access. The non-production environment 102 is private cloud system that is isolated from the public cloud system and only accessible by the security manager 109 to test the deployment before it is deployed onto a public cloud system. The deployment engine manages the non-production environment to mirror the production environment 103 so that accurate deployment tests can be facilitated.

In the non-production environment 102, the application is deployed. The application in this environment contains not only the services 104, building blocks for the application, but also the API/interface (IF) monitoring proxy 105 and the call history 106. The API/IF monitoring proxy 105 is one of the proxies running on the sidecars, which monitors and logs all network traffic into and out of a microservice. The call history 106 is the database to store all logs outputted from the API/IF monitoring proxy 105. The application analyzer 107 is a building block to get the use case based authorization configurations 108 created by the security manager 109, reads logs stored in the call history 106, and creates authorization configurations for microservices which are stored in the authorization configuration series 110.

The use case based authorization configurations 108 is a configuration file created by the security manager 109. The use case based authorization configurations 108 includes authorization configurations (e.g., scope of user access) for each user interface (UI) component and each API access. Thu, the use case based authorization configurations 108 do not need to contain authorization configurations for all microservices. Further details regarding the use case based authorizations are provided herein.

The security manager 109 is a person or a team that designs the application from a security viewpoint. The security manager 109 decides the authorization policies for UI and API access, in particular for each UI component and API. The authorization configurations series 110 is the data store that manages the authorization configurations for each microservice made by the application analyzer 107. Further details of the authorization configuration series 110 are described below.

The authorization configuration creator 111 creates actual authorization configurations for each of the microservices that are installed in the authorization proxy 113. The actual authorization configurations are converted from the authorization configurations stored in the authorization configurations series 110. The actual authorization configurations are deployed into the authorization proxy 113 by the deployment engine 101.

The microservice 112 is the deployed microservices in the production environment 103, and is similar to microservice 104. However, the microservice 112 might differ sometimes from the microservice 104 because the environment variables for the production version might be applied to the microservice 112, whereas the environment variables for the non-production version might be applied to the microservice 104.

The authorization proxy 113 is one of proxies running on the sidecars. It authorizes the request to each microservice 112 with the authorization configuration created by the authorization configuration creator 111.

Figure 2:
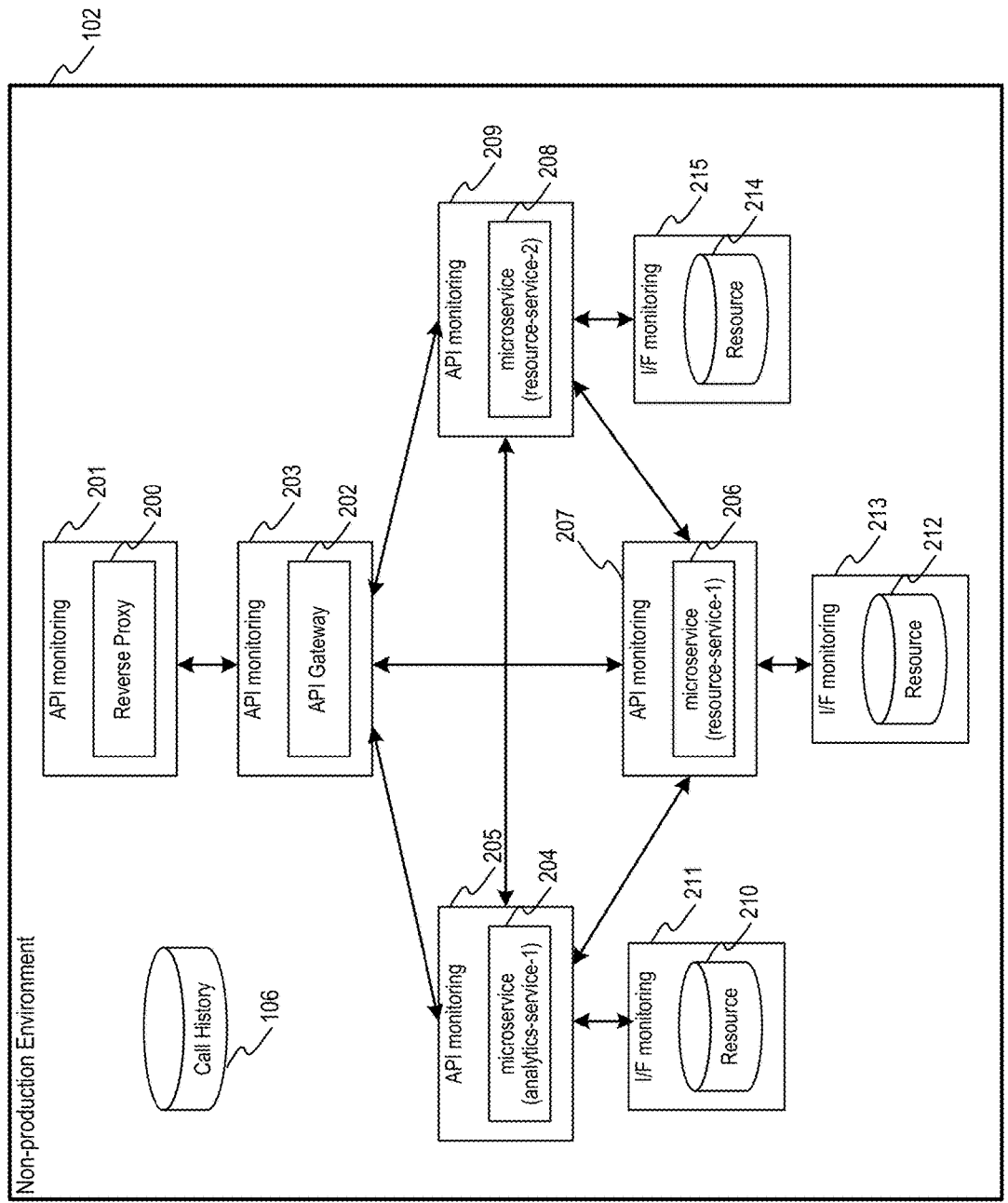
FIG. 2 illustrates an example of a deployed application in the non-production environment, in accordance with an example implementation.

FIG. 2 illustrates an example of a deployed application in the non-production environment 102, in accordance with an example implementation. The application can include microservices 200~208. The reverse proxy 200 is an entry point to the application. The reverse proxy 200 could give the capability of the HTTPS endpoint and the dispatcher of the external requests to some internal services. The API gateway 202 is a building block to work as a gateway for API access. The API gateway 202 could work to dispatch the API requests to other microservices.

The microservices 204, 206, 208 involve services to facilitate some function (e.g., business function). For example, a microservice can be in charge of a business logic and configured to read, create, update, and delete specific resources. Thus, each of the microservices 204, 206, 208 involve a respective data resource collection 210, 212, 214.

The API monitoring 201, 203, 205, 207, 209 and the I/F monitoring 211, 213, 215 are proxies installed in the service mesh framework. The API monitoring and I/F monitoring monitor all network traffic, including requests to each microservice and response from each microservice, and send the traffic logs into the call history 106.

Figure 3:
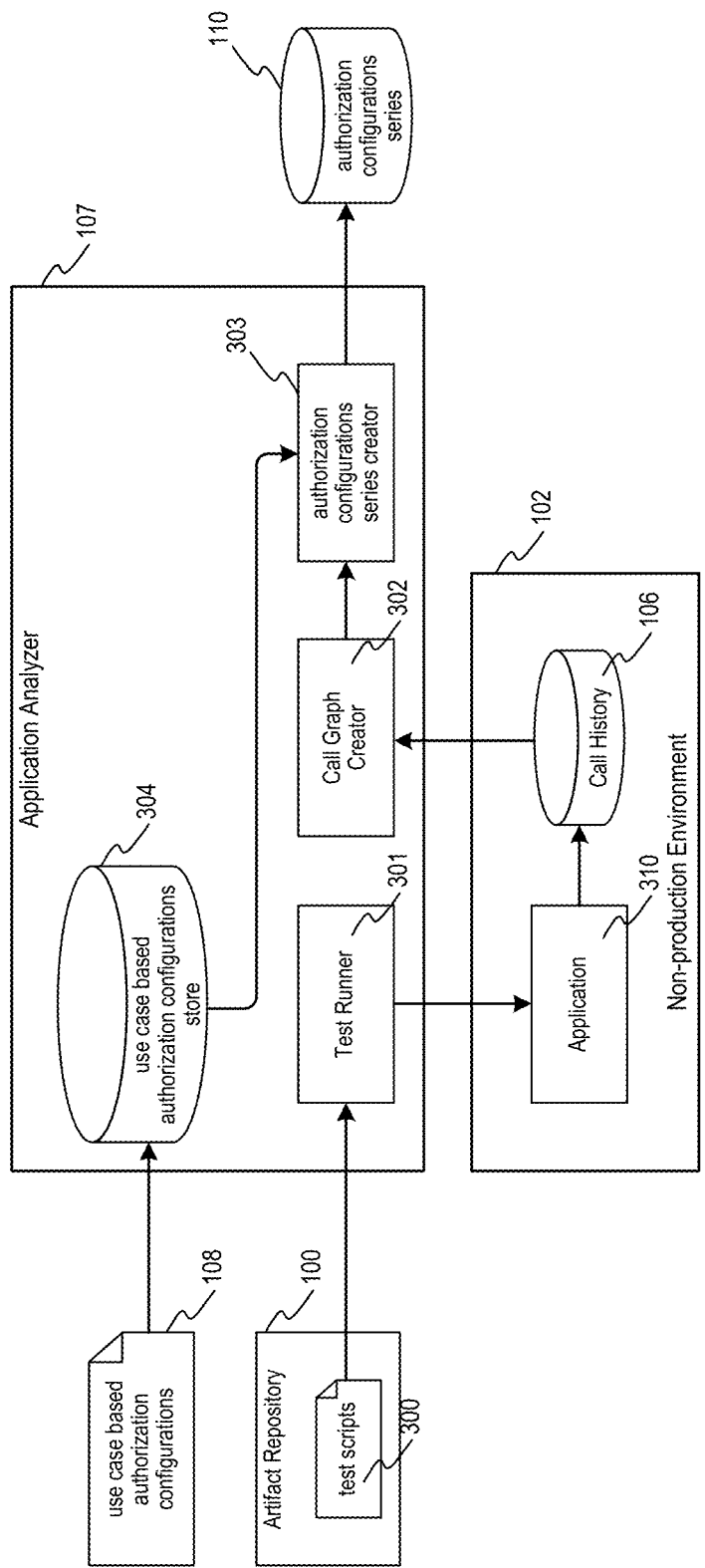
FIG. 3 illustrates the details of the application analyzer, in accordance with an example implementation.

FIG. 3 illustrates the details of the application analyzer 107, in accordance with an example implementation. The application analyzer 107 involves the test runner 301, the call graph creator 302, the authorization configurations series creator 303, and use case based authorization configurations store 304. The test runner 301 runs tests 300 store in the artifact repository 100. The test scripts 300 are utilized not for verifying the code quality, but for getting the traffic logs. So, the test runner 301 runs the application 310 with the test scripts 300. The application 310 is the application that includes all services shown in FIG. 2.

In example implementations, the test scripts 300 can contain multiple tests, wherein each test can be written by each component, and the test runner 301 runs each test independently. Such example implementations can make each test create the network logs with a unique timestamp that allows the call graph creator 302 to create the call graph easily.

The call graph creator 302 creates the call graph with nodes that indicate microservices and branches that indicate the relationships between microservices. The call graph is made from the network traffic logs stored in the call history 106. Examples of the call graph are provided in detail below.

The authorization configurations series creator 303 creates an authorization configuration for each microservice which is installed in the authorization proxy 113, based on the use case based authorization configurations 108 stored in the use case based authorization configurations store 304 and the call graphs created by the call graph creator 302, and then it outputs the authorization configurations series into the authorization configurations series store 110.

Figure 4:
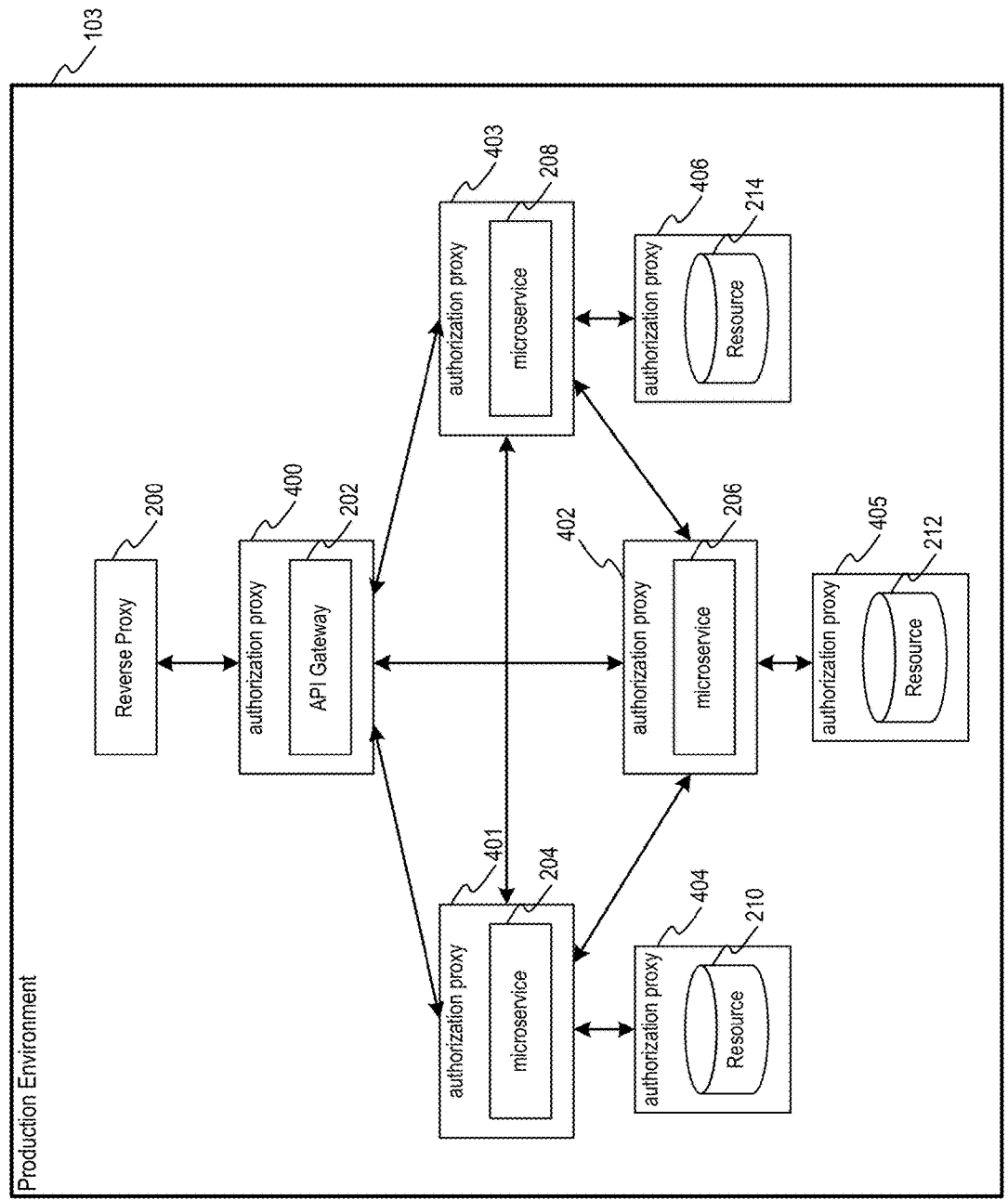
FIG. 4 illustrates an example of a deployed application in the production environment, in accordance with an example implementation.

FIG. 4 illustrates an example of a deployed application in the production environment 103, in accordance with an example implementation. The difference from the deployed application in the non-production environment 102 shown in FIG. 2 is that the application in the production environment 103 does not utilize the API monitoring 201, 203, 205, 207, 209 and the I/F monitoring 211, 213, 215, but utilizes authorization proxies 400, 401, 402, 403, 404, 405, and 406. The authorization proxies 400, 401, 402, 403, 404, 405, 406 work before the microservice 204, 206, 208 and authorize the requests to the proxies. The methods for this authorization proxies are given by the authorization configurations series 110.

Figure 5:
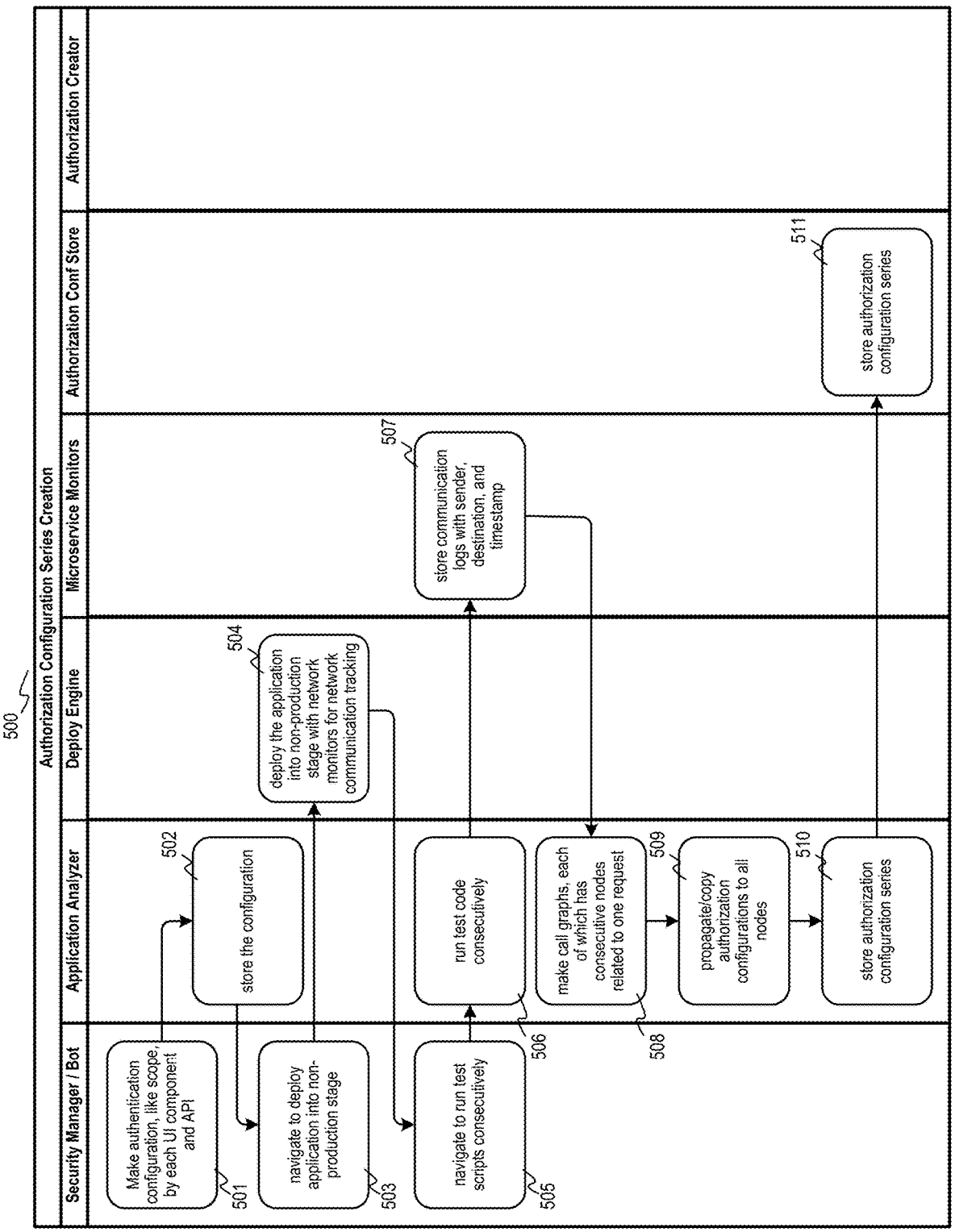
FIG. 5 illustrates the flow chart of creating authorization configurations series stored in the authorization configurations series, in accordance with an example implementation.

FIG. 5 illustrates the flow chart of creating authorization configurations series stored in the authorization configurations series 110, in accordance with an example implementation. The security manager 109 makes authentication configuration list by each UI component and API (501). The flow of FIG. 5 will be illustrated with respect to FIG. 7 to FIG. 11 as follows. The concrete example of the authentication configuration list by each UI component and API is 800 as shown in FIG. 8. As shown in FIG. 8, the authentication configuration list can involve component identifier (ID), component name, and authorization scope. Component ID indicates the component associated with the authentication configuration. Component name indicates the name of the component. Authorization scope indicates the authentication configuration of the corresponding component.

Figure 7:
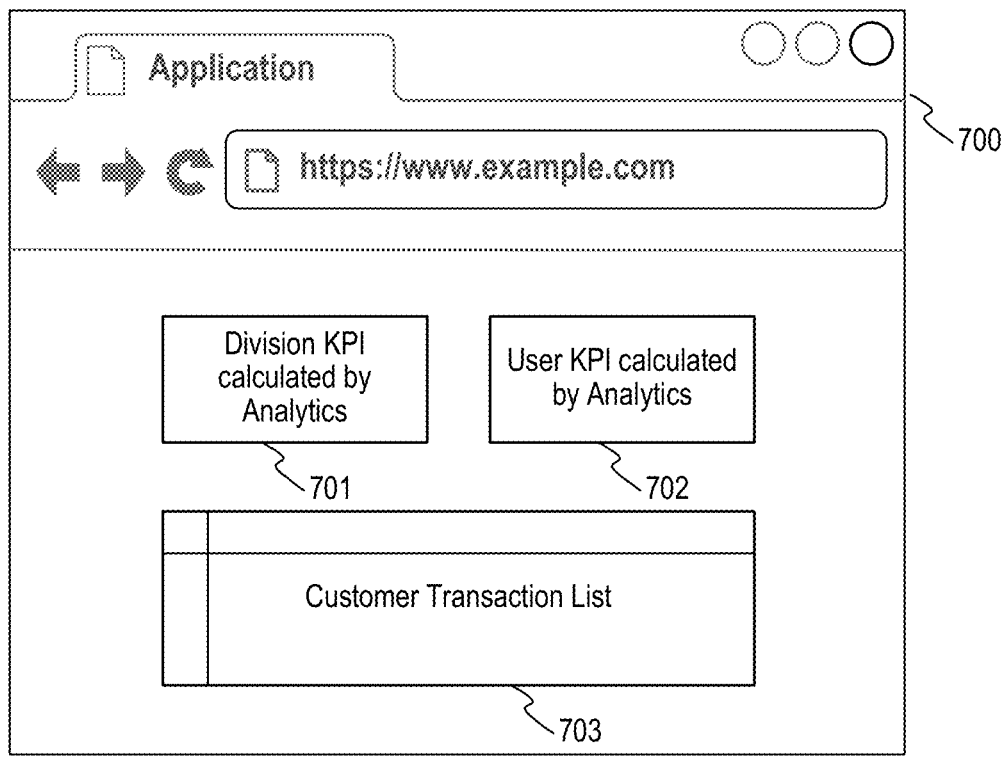
FIG. 7 illustrates an example user interface upon which example implementations may be applied.

In example implementations, the UI can be the UI as shown at 700 in FIG. 7. UI 700 has three components: component that shows the division KPI calculated by analytics 701, component that shows the user KPI calculated by analytics 702, and the component that shows list involving the raw data of customer transaction 703. The security manager 109 decides the access to each component for a given user, and then creates the authentication configuration list by each UI component 800. In the list 800, for example, the component that shows the division KPI calculated by analytics 701 requires the user to have a user role higher than "manager" to be read. However, the component does not require any user role for write privileges because the component is configured to only display the KPI without any write capability. Similarly, the component that shows the user KPI calculated by analytics 702 requires the user role over "user" to be read. However, the component does not require any user role for write privileges because the component is configured to only display the KPI without the capability to write. The user who has the role over "user" can read the component, which will provide a list involving the raw data of the customer transaction 703.

The authorization configurations that the security manager 109 made are stored in the use case based authorization configurations store 304 (502).

The security manager 109 navigates to deploy the application into the non-production stage (503). If deployment automation is introduced, this process can also be conducted by an automated program such as a bot program software implementation. Per the flow at 503, the deployment engine 101 deploys the application into non-production stage 102 with the API monitoring 201, 203, 205, 207, 209 and the I/F monitoring 211, 213, 215 (504).

The security manager 109 or the bot navigates to run the test scripts 300 (505), and the application analyzer 107 runs the test scripts (506).

The application running on the non-production environment 102 runs with the test scripts 300 and sends the network traffic logs into the call history 106 (507). FIG. 9 illustrates an example of network traffic logs 900, in accordance with an example implementation. Such traffic logs are made by an access to the component shown in the second row of the table 800. Each log involves a source identifier that sends requests, a destination identifier that receives requests, the endpoint to which the destination service opens and the source client can access, the timestamp indicating the time the logs are generated, and others, in accordance with an example implementation. In example implementations, the source identifier and the destination identifier could be IP address or hostname, depending on the desired implementation. Similarly, the endpoint can be a uniform resource locator (URL) path that is in the request header.

Figure 10:
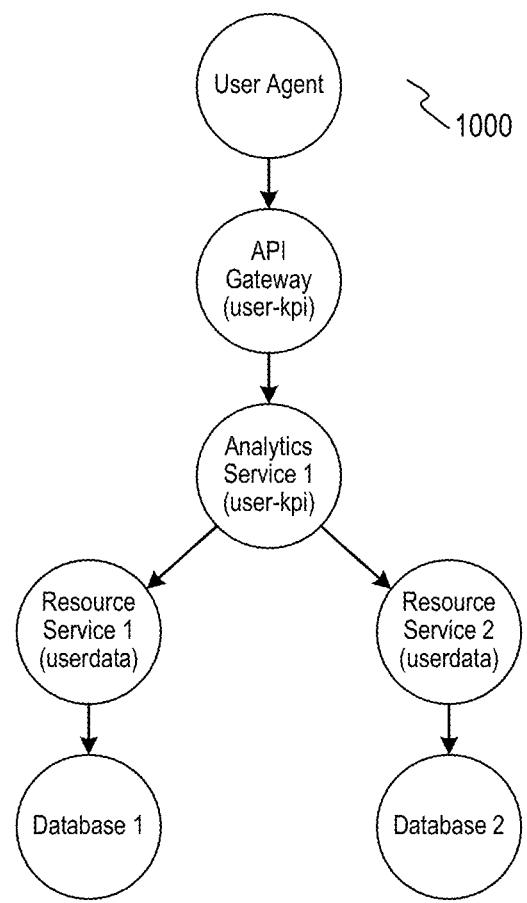
FIG. 10 illustrates an example of a call graph, in accordance with an example implementation.

The call graph creator 302 makes the call graphs (508). FIG. 10 illustrates an example of a call graph 1000, in accordance with an example implementation. The call graph 1000 is made from the traffic logs 900. Each node represents each microservice. If the microservice has multiple endpoints, the node also has the endpoint shown in the table 900. The root node of call graph 1000 is the user agent that is generally a browser if the application is the web application. The user agent node connects to the API gateway 202, which relationship is created from the first and last logs in the table 900. The same mechanism creates other relationships by other logs in the table 900.

The authorization configurations series creator 303 creates the authorization configurations plan from the use case based authorization configurations 108 and the call graph 1000 (509). Basically, the authorization configurations series creator 303 propagates the same configuration written in the use case based authorization configurations 108 to all nodes (microservices) in the call graph 1000. The call graph 1000 is made by a test access to the component that has ID 2 shown in the table 800 so that the authorization configurations series creator 303 copies the authorization scope "read: user, write: null" written in the second row of the table 800 to all nodes.

Figure 11:
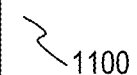
FIG. 11 illustrates an example of authorization configuration series, in accordance with an example implementation.

FIG. 11 illustrates an example of authorization configuration series, in accordance with an example implementation. The authorization configurations series 1100 includes identifiers and an authorization scope. In the table 1100, identifiers are the microservice name and endpoint path, and an example of the authorization scope is "read: user, write: null."

There might be some cases in which items having the same identifiers involve a different authorization scope. That might be caused when two tests for the different UI components use the same microservice and the same endpoint with the different user roles. In that case, the authorization configurations series creator 303 allows the item to have a lower role. For instance, in the case the item has two scopes: "read: user, write: null" and "read: manager, write: null", the authorization configurations series creator 303 should set the item to have "read: user, write: null."

The authorization configurations series creator 303 stores the created authorization configuration series 1100 into the authorization configurations series store 110 (510 and 511).

Figure 6:
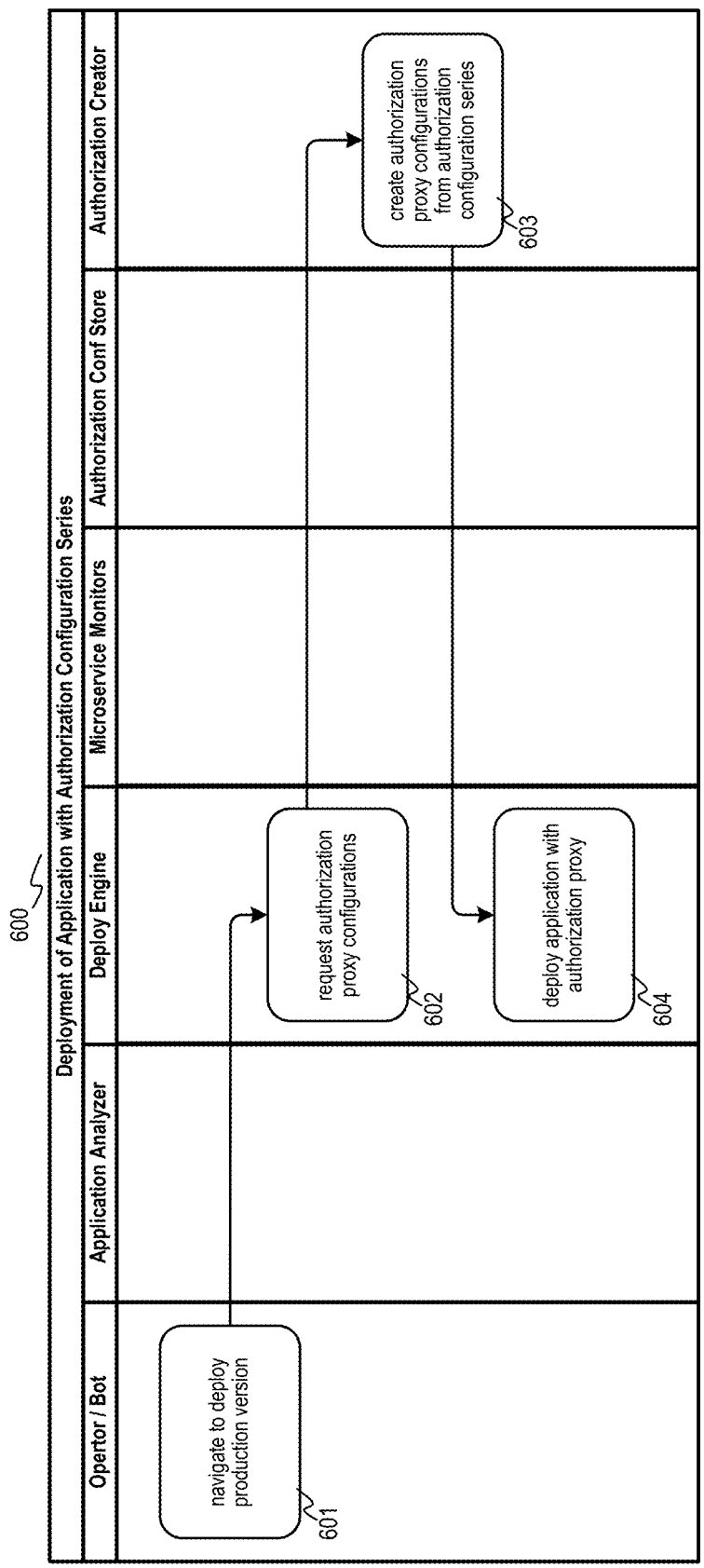
FIG. 6 illustrates the flow chart of creating authorization configurations installed into the authorization proxy, in accordance with an example implementation.

FIG. 6 illustrates the flow chart of creating authorization configurations installed into the authorization proxy 113, in accordance with an example implementation. Operators who manage to deploy the production version of the application, or the bot that is software triggered by some sort of event, navigates to deploy the production version of the application (601).

The deployment engine 101 requests the authorization configurations that will be installed into the authorization proxy 113 to the authorization configuration creator 111. The authorization configuration creator 111 creates "actual" authorization configurations that will be installed into the authorization proxy 113 by referring the table 1100. An implementation of actual authorization configurations that will be installed into the authorization proxy 113 depends on the service mesh implementation.

FIG. 12 illustrates an example implementation for when the service mesh allows an implementation an authorization method as a function written by JavaScript, in accordance with an example implementation. The function 1200 is called by the service mesh when the request comes to. If the function 1200 returns True, then the function 1200 indicates that the request is authorized successfully.

This first example implementation creates an authorization configuration for all microservices by using the root configuration for each UI component that the security manager makes. Thus, the example implementation reduces a lot of time that the security manager wastes in creating an authorization configuration for all microservices.

In a second example implementation, there is another basic use case that can be utilized. The second example implementation deals with the case using another type of API access, like GraphQL instead of REST API. While the first example implementation uses endpoint paths as one of identifiers of microservice, the second example implementation uses a query string sent in requests as one of identifiers. That is because microservices basically have only one endpoint and are informed of the intention of the client by the GraphQL query string sent in the requests.

In the second example implementation, the system architecture is the same as the first example implementation. The differences from the first example implementation involve the log format stored in the call history 106, the format of authorization configurations series stored in the authorization configurations series store 110, and the actual authentication configurations which are installed in the authorization proxy 113.

FIG. 14 illustrates the example of the network traffic logs for the second example implementation. The table 1400 has a column named "request query" instead of endpoint. This column stores the query string sent in the requests. The request query column of the table 1400 is used as an identifier to recognize each item of the logs.

Figure 15:
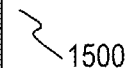
FIG. 15 illustrates the example of the authorization configurations series in accordance with another example implementation.

FIG. 15 illustrates the example of the authorization configurations series for the second example implementation. The table 1500 has a column named "request query" instead of endpoint. This column stores the query string sent in the requests. The request query column of the table 1500 is used as an identifier to recognize each item of the authentication configurations series.

FIG. 16 illustrates an example implementation when the service mesh allows the implementation of an authorization method as a function written by JavaScript. The function 1600 is called by the service mesh when the request is received. The function 1600 returns true if the request is authorized successfully.

The second example implementation creates an authorization configuration for all microservices by using the root configuration for each UI component that the security manger makes. So, the second example implementation can reduce the time that the security manager needs to create authorization configuration for all microservices when the microservices opens GraphQL-like API.

Figure 17:
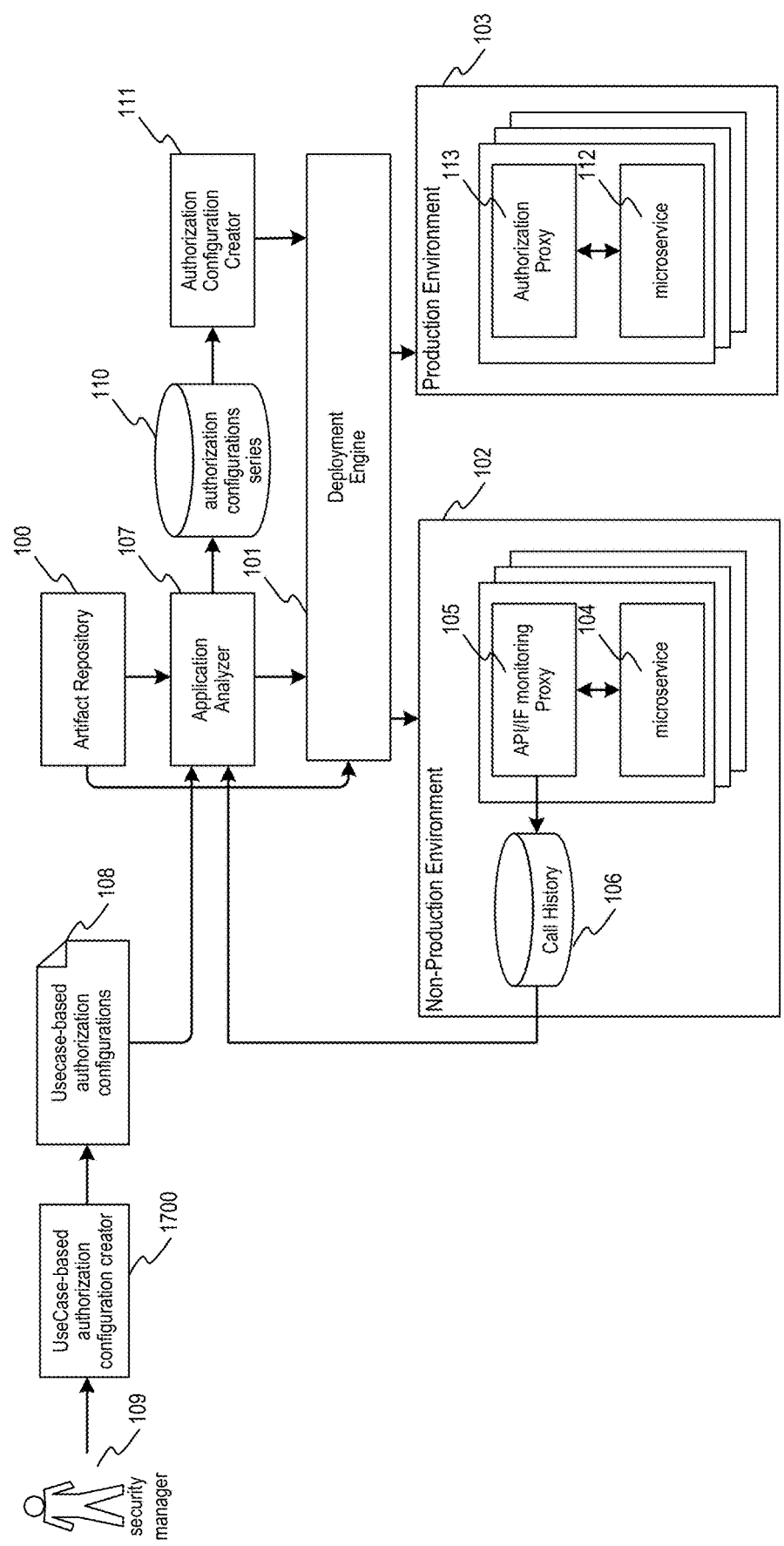
FIG. 17 illustrates a system architecture in accordance with another example implementation.
Figure 18:
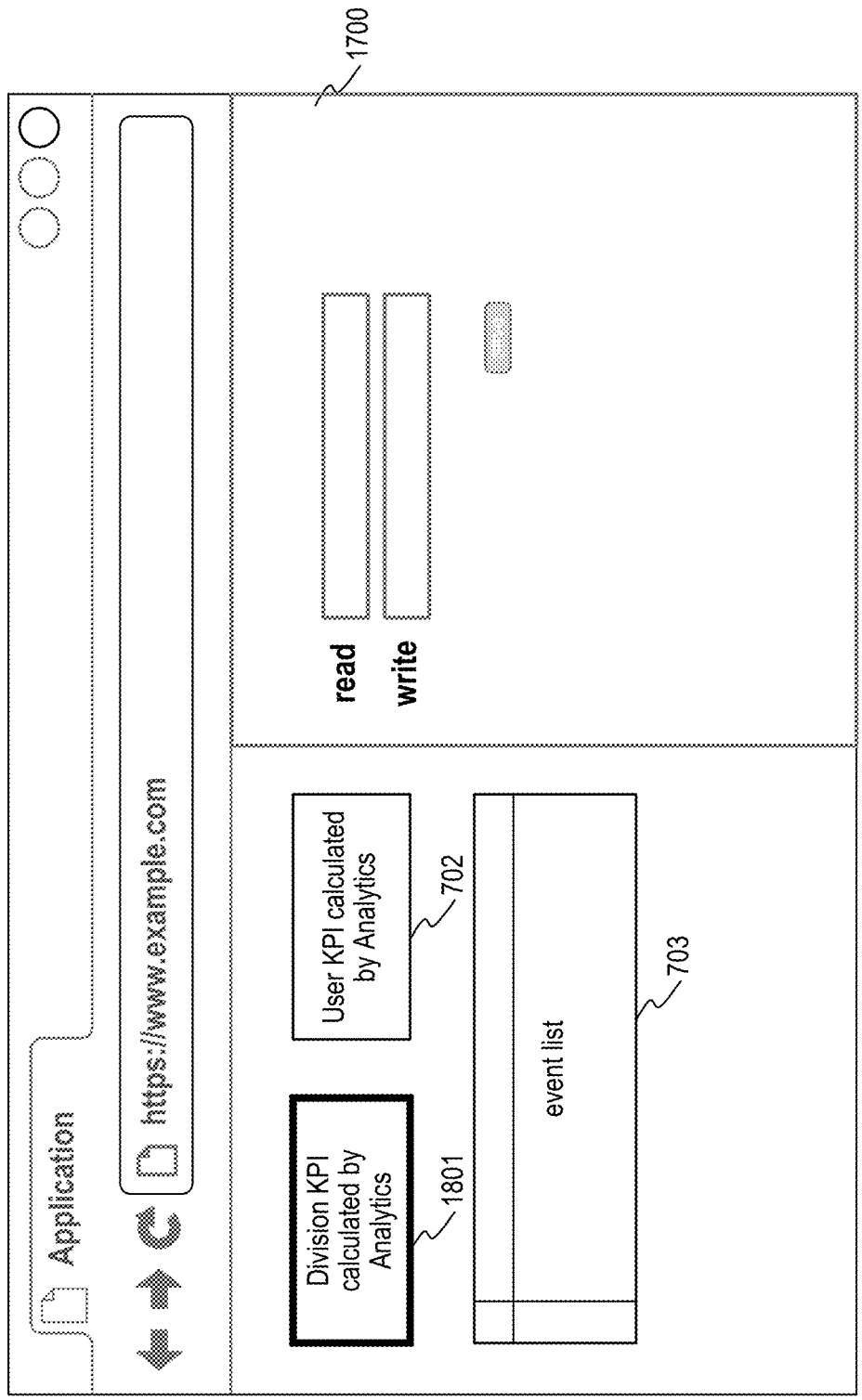
FIG. 18 illustrates the example of the usecase-based authorization configuration creator, in accordance with an example implementation.

In a third example implementation, there is an additional feature that can be utilized in accordance with the desired implementation. FIG. 17 illustrates a system architecture in accordance with a third example implementation, which differs from the first example implementation by the usecase-based authorization configuration creator 1700. FIG. 18 illustrates the example of the usecase-based authorization configuration creator 1700, in accordance with an example implementation. It is the front-end application that makes the usecase-based authorization configurations 108. When the security manager 109 clicks one of the components 1801, the component of division KPI in FIG. 18, the detailed view is provided in which the security manager 109 can make the authorization configurations with a GUI based operation.

This example implementations creates an authorization configuration for all microservices by using the root configuration for each UI component that the security manger makes with a GUI based operation. Thus, such example implementations reduce the time that the security manager needs to create authorization configuration for all microservices.

Figure 19:
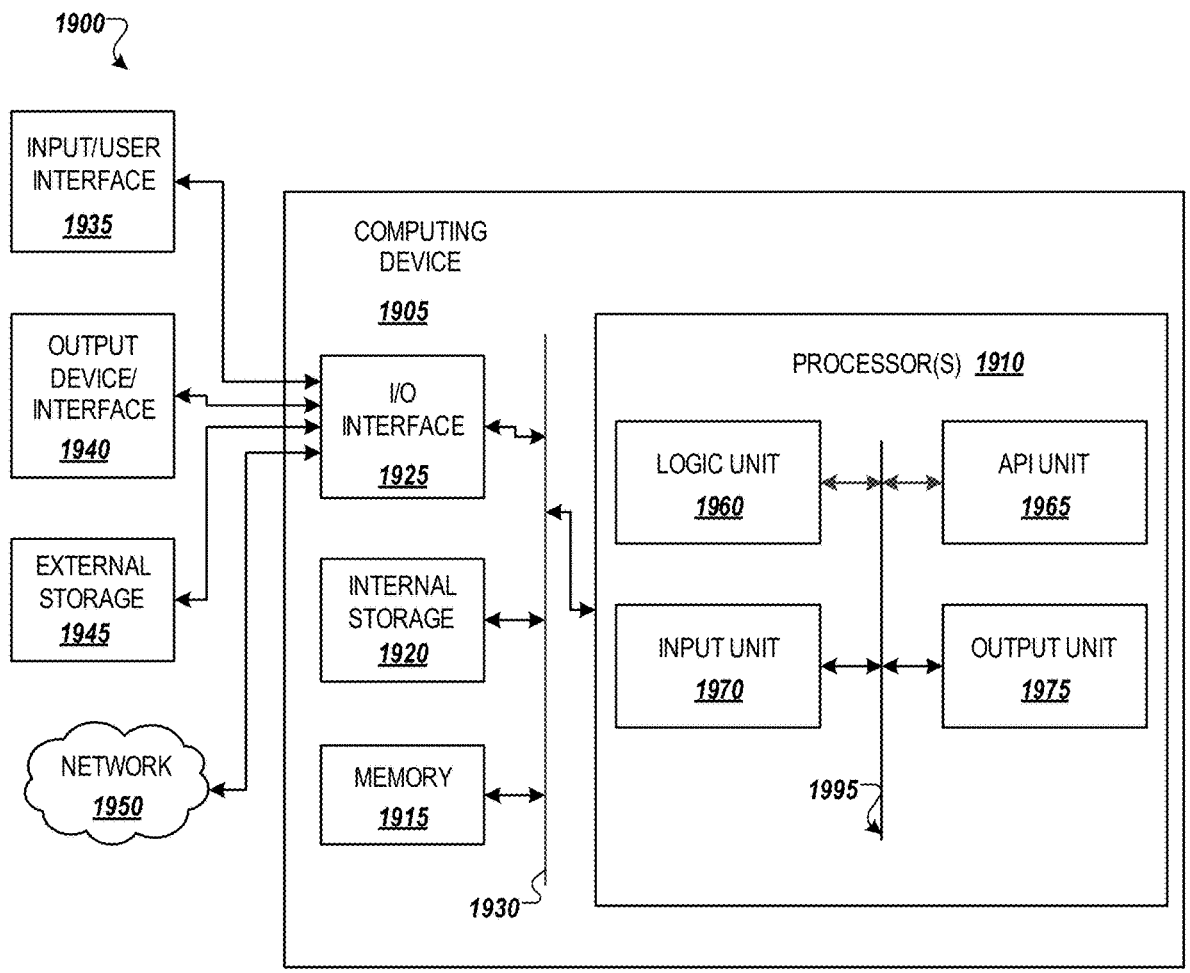
FIG. 19 illustrates an example computing environment with an example computer device suitable for use in some example implementations.

FIG. 19 illustrates an example computing environment with an example computer device suitable for use in some example implementations, such as an apparatus configured to manage deployment of authorization configurations to an environment involving a plurality of microservices as illustrated in FIGS. 1, 2 and 17. Computer device 1905 in computing environment 1900 can include one or more processing units, cores, or processors 1910, memory 1915 (e.g., RAM, ROM, and/or the like), internal storage 1920 (e.g., magnetic, optical, solid state storage, and/or organic), and/or I/O interface 1925, any of which can be coupled on a communication mechanism or bus 1930 for communicating information or embedded in the computer device 1905. I/O interface 1925 is also configured to receive images from cameras or provide images to projectors or displays, depending on the desired implementation.

Computer device 1905 can be communicatively coupled to input/user interface 1935 and output device/interface 1940. Either one or both of input/user interface 1935 and output device/interface 1940 can be a wired or wireless interface and can be detachable. Input/user interface 1935 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1940 may include a display, television, monitor, printer, speaker, braille, or the like. In some example implementations, input/user interface 1935 and output device/interface 1940 can be embedded with or physically coupled to the computer device 1905. In other example implementations, other computer devices may function as or provide the functions of input/user interface 1935 and output device/interface 1940 for a computer device 1905.

Examples of computer device 1905 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1905 can be communicatively coupled (e.g., via I/O interface 1925) to external storage 1945 and network 1950 for communicating with any number of networked components, devices, and systems, including one or more computer devices of the same or different configuration. Computer device 1905 or any connected computer device can be functioning as, providing services of, or referred to as a server, client, thin server, general machine, special-purpose machine, or another label.

I/O interface 1925 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1900. Network 1950 can be any network or combination of networks (e.g., the Internet, local area network, wide area network, a telephonic network, a cellular network, satellite network, and the like).

Computer device 1905 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1905 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1910 can execute under any operating system (OS) (not shown), in a native or virtual environment. One or more applications can be deployed that include logic unit 1960, application programming interface (API) unit 1965, input unit 1970, output unit 1975, and inter-unit communication mechanism 1995 for the different units to communicate with each other, with the OS, and with other applications (not shown). The described units and elements can be varied in design, function, configuration, or implementation and are not limited to the descriptions provided. Processor(s) 1910 can be in the form of hardware processors such as central processing units (CPUs) or in a combination of hardware and software units.

In some example implementations, when information or an execution instruction is received by API unit 1965, it may be communicated to one or more other units (e.g., logic unit 1960, input unit 1970, output unit 1975). In some instances, logic unit 1960 may be configured to control the information flow among the units and direct the services provided by API unit 1965, input unit 1970, output unit 1975, in some example implementations described above. For example, the flow of one or more processes or implementations may be controlled by logic unit 1960 alone or in conjunction with API unit 1965. The input unit 1970 may be configured to obtain input for the calculations described in the example implementations, and the output unit 1975 may be configured to provide output based on the calculations described in example implementations.

Processor(s) 1910 can be configured to receive a component request for authorization as illustrated at 501 and 502 of FIG. 5, deploy a component associated with the component request on a test environment that mirrors the environment to receive a call history graph comprising one or more of the plurality of microservices invoked by the component as illustrated at 503-508 of FIG. 5; generate the authorization configurations for each of the one or more of the plurality of microservices based on the component request and the call history graph; and deploy the authorization configurations to the one or more of the plurality of microservices on the environment as illustrated at 509-511 of FIG. 9.

Depending on the desired implementation, each of the plurality of microservices can involve its own sidecar layer illustrated in FIG. 2 with API or I/F monitoring configured to monitor a source of a received communication as, a destination of the received communication, and an endpoint of the received communication as illustrated in FIG. 9. As described with respect to the first example implementation, processor(s) 1910 can be configured to deploy the component on the test environment that mirrors the environment to receive the call history graph by executing scripts on the component to facilitate a plurality of communications to the sidecar layer as described with respect to 505 and 506 of FIG. 5, determining, from the source, the destination, and the endpoint of each of the plurality of communications, the one or more of the plurality of microservices invoked by the component as described in 507 and as illustrated from FIGS. 7 to 13; and generating the call graph from the one or more of the plurality of microservices, the call graph linking the one or more of the plurality of microservices based on a timestamp associated with the each of the plurality of communications as described at 508 and as illustrated from FIGS. 7 to 13. In any of the example implementations described herein, the sidecar layer can be configured to connect the plurality of microservices to each other through facilitating a service mesh as illustrated in FIG. 2.

In a second example implementation, the plurality of microservices comprises a sidecar layer configured to monitor a source of a received communication, a destination of the received communication, and a request query associated with the received communication, wherein the processor is configured to deploy the component on the test environment that mirrors the environment to receive the call history graph by executing scripts on the component to facilitate a plurality of communications to the sidecar layer as illustrated at 505 and 506 of FIG. 5, determining, from the source, the destination, and the request query of each of the plurality of communications, the one or more of the plurality of microservices invoked by the component as illustrated at 507 of FIG. 5 and FIG. 14; and generating the call graph from the one or more of the plurality of microservices, the call graph linking the one or more of the plurality of microservices based on a timestamp associated with the each of the plurality of communications as illustrated in FIG. 10.

As described in a third example implementation the processor(s) 1910 can be configured to receive the component request for authorization by providing a user interface for receiving a selection of the component and receiving a use case authorization configuration for the component, wherein the processor is configured to generate the authorization configurations for each of the one or more of the plurality of microservices based on the component request and the call history graph by generating authorization configurations for each of the one or more of the plurality of microservices in the call history graph according to the use case authorization configuration as illustrated in FIGS. 17 and 18. The use case can be formed in any manner in accordance with the desired implementation (e.g., accessible to users above manager level, etc.)

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method to deploy authorization configurations to an environment comprising a plurality of microservices, the method comprising:
   receiving a component request for authorization;
   deploying a component associated with the component request on a test environment that mirrors the environment to receive a call history graph comprising one or more of the plurality of microservices invoked by the component;
   generating the authorization configurations for each of the one or more of the plurality of microservices based on the component request and the call history graph; and
   deploying the authorization configurations to the one or more of the plurality of microservices on the environment;
   wherein each of the plurality of microservices comprises a sidecar layer configured to monitor a source of a received communication, a destination of the received communication, and an endpoint of the received communication, wherein deploying the component on the test environment that mirrors the environment to receive the call history graph comprises:
   executing scripts on the component to facilitate a plurality of communications to the sidecar layer;
   determining, from the source, the destination, and the endpoint of each of the plurality of communications, the one or more of the plurality of microservices invoked by the component; and
   generating the call graph from the one or more of the plurality of microservices, the call graph linking the one or more of the plurality of microservices based on a timestamp associated with the each of the plurality of communications.

2. The method of claim 1, wherein the sidecar layer connects the plurality of microservices to each other through facilitating a service mesh.

3. The method of claim 1, wherein each of the plurality of microservices comprises a sidecar layer configured to monitor a source of a received communication, a destination of the received communication, and a request query associated with the received communication, wherein deploying the component on the test environment that mirrors the environment to receive the call history graph comprises:
   executing scripts on the component to facilitate a plurality of communications to the sidecar layer;
   determining, from the source, the destination, and the request query of each of the plurality of communications, the one or more of the plurality of microservices invoked by the component; and
   generating the call graph from the one or more of the plurality of microservices, the call graph linking the one or more of the plurality of microservices based on a timestamp associated with the each of the plurality of communications.

4. The method of claim 1, wherein the receiving the component request for authorization comprises providing a user interface for receiving a selection of the component and receiving a use case authorization configuration for the component, wherein the generating the authorization configurations for each of the one or more of the plurality of microservices based on the component request and the call history graph comprises generating authorization configurations for each of the one or more of the plurality of microservices in the call history graph according to the use case authorization configuration.

5. The method of claim 1, wherein the environment is a public cloud system, and the test environment is a private cloud system that is isolated from the public cloud system.

6. A non-transitory computer readable medium, storing instructions to execute a process to deploy authorization configurations to an environment comprising a plurality of microservices, the instructions comprising:
   receiving a component request for authorization;
   deploying a component associated with the component request on a test environment that mirrors the environment to receive a call history graph comprising one or more of the plurality of microservices invoked by the component;
generating the authorization configurations for each of the one or more of the plurality of microservices based on the component request and the call history graph; and
deploying the authorization configurations to the one or more of the plurality of microservices on the environment;
wherein each of the plurality of microservices comprises a sidecar layer configured to monitor a source of a received communication, a destination of the received communication, and an endpoint of the received communication, wherein deploying the component on the test environment that mirrors the environment to receive the call history graph comprises:
executing scripts on the component to facilitate a plurality of communications to the sidecar layer;
determining, from the source, the destination, and the endpoint of each of the plurality of communications, the one or more of the plurality of microservices invoked by the component; and
generating the call graph from the one or more of the plurality of microservices, the call graph linking the one or more of the plurality of microservices based on a timestamp associated with the each of the plurality of communications.

7. The non-transitory computer readable medium of claim 6, wherein the sidecar layer connects the plurality of microservices to each other through facilitating a service mesh.

8. The non-transitory computer readable medium of claim 6, wherein each of the plurality of microservices comprises a sidecar layer configured to monitor a source of a received communication, a destination of the received communication, and a request query associated with the received communication, wherein deploying the component on the test environment that mirrors the environment to receive the call history graph comprises:
executing scripts on the component to facilitate a plurality of communications to the sidecar layer,
determining, from the source, the destination, and the request query of each of the plurality of communications, the one or more of the plurality of microservices invoked by the component; and
generating the call graph from the one or more of the plurality of microservices, the call graph linking the one or more of the plurality of microservices based on a timestamp associated with the each of the plurality of communications.

9. The non-transitory computer readable medium of claim 6, wherein the receiving the component request for authorization comprises providing a user interface for receiving a selection of the component and receiving a use case authorization configuration for the component, wherein the generating the authorization configurations for each of the one or more of the plurality of microservices based on the component request and the call history graph comprises generating authorization configurations for each of the one or more of the plurality of microservices in the call history graph according to the use case authorization configuration.

10. The non-transitory computer readable medium of claim 6, wherein the environment is a public cloud system, and the test environment is a private cloud system that is isolated from the public cloud system.

11. An apparatus configured to manage deployment of authorization configurations to an environment comprising a plurality of microservices, the apparatus comprising:

a processor, configured to:
receive a component request for authorization;
deploy a component associated with the component request on a test environment that mirrors the environment to receive a call history graph comprising one or more of the plurality of microservices invoked by the component;
generate the authorization configurations for each of the one or more of the plurality of microservices based on the component request and the call history graph; and
deploy the authorization configurations to the one or more of the plurality of microservices on the environment;
wherein each of the plurality of microservices comprises a sidecar layer configured to monitor a source of a received communication, a destination of the received communication, and an endpoint of the received communication, wherein the processor is configured to deploy the component on the test environment that mirrors the environment to receive the call history graph by:
executing scripts on the component to facilitate a plurality of communications to the sidecar layer;
determining, from the source, the destination, and the endpoint of each of the plurality of communications, the one or more of the plurality of microservices invoked by the component; and
generating the call graph from the one or more of the plurality of microservices, the call graph linking the one or more of the plurality of microservices based on a timestamp associated with the each of the plurality of communications.

12. The apparatus of claim 11, wherein the sidecar layer connects the plurality of microservices to each other through facilitating a service mesh.

13. The apparatus of claim 11, wherein each of the plurality of microservices comprises a sidecar layer configured to monitor a source of a received communication, a destination of the received communication, and a request query associated with the received communication, wherein the processor is configured to deploy the component on the test environment that mirrors the environment to receive the call history graph by:
executing scripts on the component to facilitate a plurality of communications to the sidecar layer,
determining, from the source, the destination, and the request query of each of the plurality of communications, the one or more of the plurality of microservices invoked by the component; and
generating the call graph from the one or more of the plurality of microservices, the call graph linking the one or more of the plurality of microservices based on a timestamp associated with the each of the plurality of communications.

14. The apparatus of claim 11, wherein the processor is configured to receive the component request for authorization by providing a user interface for receiving a selection of the component and receiving a use case authorization configuration for the component, wherein the processor is configured to generate the authorization configurations for each of the one or more of the plurality of microservices based on the component request and the call history graph by generating authorization configurations for each of the one or more of the plurality of microservices in the call history graph according to the use case authorization configuration.

15. The apparatus of claim 11, wherein the environment is a public cloud system, and the test environment is a private cloud system that is isolated from the public cloud system.

* * * * *